United States Patent [19]

Cleman et al.

[11] 4,017,280
[45] Apr. 12, 1977

[54] ANTI-POLLUTION DEVICE FOR INCINERATORS AND THE LIKE

[76] Inventors: Charles F. Cleman, 4401 Pacific Highway East, Tacoma, Wash. 98424; David E. Gilligan, 1010 Grand Ave., Centralia, Wash. 98531

[22] Filed: Mar. 14, 1975

[21] Appl. No.: 558,829

[52] U.S. Cl. .................... 55/255; 55/259; 55/318; 55/433; 55/437; 55/446; 55/467; 55/473; 55/DIG. 27; 55/DIG. 30; 110/119; 261/96; 261/123; 261/DIG. 9; 261/DIG. 72

[51] Int. Cl.$^2$ .................... B01D 47/02

[58] Field of Search .......... 55/248, 250, 255, 256, 55/259, 257, 318, 446, 437, 442, 473, 433, 525, 529, 230, 438, 467, 471, 472, DIG. 27, DIG. 30; 261/94, 96, 123, DIG. 9, DIG. 72; 110/119

[56] References Cited

UNITED STATES PATENTS

| 598,351 | 2/1898 | Staub | 261/DIG. 72 |
|---|---|---|---|
| 607,417 | 7/1898 | Bailey | 261/96 X |
| 628,639 | 7/1899 | Steele | 55/256 |
| 1,052,898 | 2/1913 | Dietz et al. | 261/96 X |
| 1,173,187 | 2/1916 | Hechenbleikner | 261/94 |
| 1,223,684 | 4/1917 | Fleming | 55/259 X |
| 1,345,681 | 7/1920 | Kratochvil | 55/248 |
| 1,408,736 | 3/1922 | Hernu | 55/257 X |
| 2,066,683 | 1/1937 | Grubelic | 55/250 X |
| 2,239,181 | 4/1941 | Smith | 55/248 X |
| 2,273,341 | 2/1942 | Vollmer | 55/230 X |
| 2,546,479 | 3/1951 | Sodano | 261/DIG. 72 |
| 2,615,699 | 10/1952 | Dixon | 261/94 X |
| 2,648,272 | 8/1953 | Norton | 55/473 X |
| 2,921,776 | 1/1960 | Keeping | 261/94 |
| 3,054,244 | 9/1962 | Hersh | 55/248 X |
| 3,283,478 | 11/1966 | Katzman et al. | 55/230 |
| 3,291,581 | 12/1966 | Frankhauser | 55/259 X |
| 3,391,521 | 7/1968 | Pal | 55/256 X |
| 3,406,498 | 10/1968 | Wisting | 55/467 X |
| 3,520,113 | 7/1970 | Stokes | 55/259 X |
| 3,525,197 | 8/1970 | Sheehan | 261/94 X |
| 3,566,583 | 3/1971 | Ashmore | 55/DIG. 30 X |
| 3,905,786 | 9/1975 | Jorgensen | 55/230 |

FOREIGN PATENTS OR APPLICATIONS

| 41,802 | 4/1933 | France | 55/256 |
|---|---|---|---|
| 726,539 | 9/1942 | Germany | 55/259 |
| 1,146,789 | 4/1963 | Germany | 55/248 |
| 508,266 | 9/1930 | Germany | 55/467 |

Primary Examiner—Frank W. Lutter
Assistant Examiner—Kathleen J. Prunner
Attorney, Agent, or Firm—Clarence A. O'Brien; Harvey B. Jacobson

[57] ABSTRACT

A pollution control device having a tank provided with an inlet and an outlet arranged for passing a gaseous medium to be cleaned into the tank and through a bath of washing solution held in the tank. A blower unit, mounted outside of the tank, forces the gaseous medium through the bath. A line connecting the blower unit to the bath passes a quantity of washing solution through the blower unit for cooling the unit. Baffles are arranged partially immersed in the bath in the tank for creating a large surface across the gaseous flow and facilitating separation of particulate matter from the medium being cleaned. The baffles are advantageously in the form of a plurality of cylinders each constructed from a mesh material and tiered in one or more substantially vertical channels arranged within the tank.

6 Claims, 3 Drawing Figures

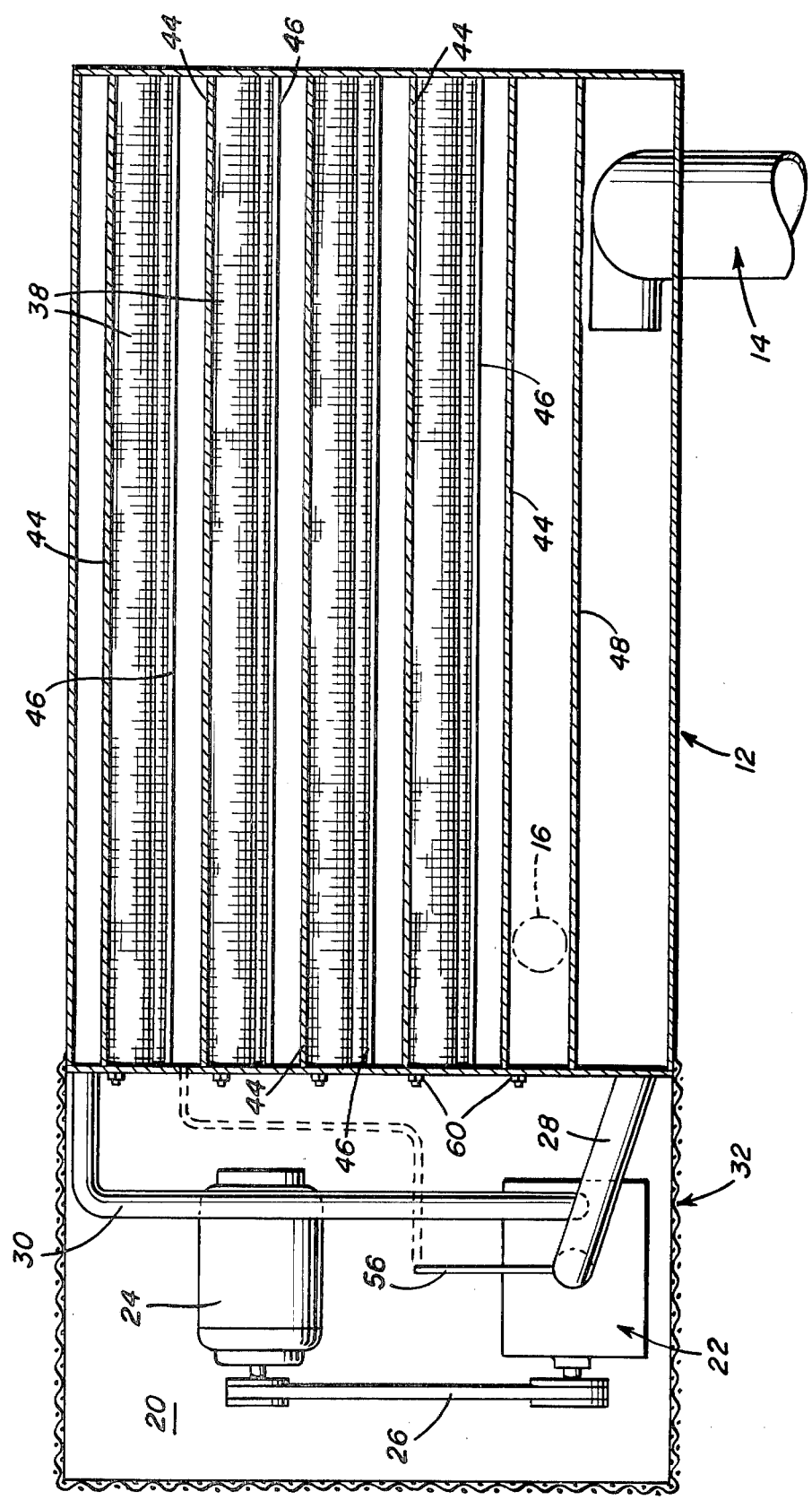

ANTI-POLLUTION DEVICE FOR INCINERATORS AND THE LIKE

BACKGROUND OF THE INVENTION

1. Field of the Invention

This invention relates generally to pollution control devices, and particularly to such devices for use on incinerators, especially those burning gas, coal, wood, and like fuels, furnaces of all classes, internal combustion engines, and the like.

2. Description of the Prior Art

A serious problem has arisen in recent years as to the detrimental effect on the quality of the air in the earth's atmosphere due to the pollution generated from incineration plants, and the like. A large central incineration plant, for example, generates odors, noxious gases, and particulates, or particulate matter, with the latter category including smoke. The particulates are generated by, among other things, char of fly ash present in the combustion gases and by very small particulates present in the combustion gases due to incomplete combustion. Conventionally, the effect of these particulates on the atmosphere surrounding the pollution generating device is attempted to be minimized by cleaning the combustion gases, including the smoke, prior to releasing these gases into the air. Quite commonly a class of mechanical separators referred to generally as "scrubbers" is approved for cleaning exhaust gases, and the use of this class of separators has been increased in recent years due to the general approval of their use by the Environmental Protection Agency.

SUMMARY OF THE INVENTION

It is an object of the present invention to provide an improved separating apparatus for use with incinerators, and the like.

It is another object of the present invention to provide a pollution control device flexible in size for being used with various sizes, as well as classes, of pollution generating equipment.

It is yet another object of the present invention to provide a pollution control device which permits recovery of separated wastes so that such wastes can be converted into any of several useful by-products, including asphalt paving or fuel.

These and other objects are achieved according to the present invention by providing a pollution control device having: a tank provided with an inlet and an outlet, and holding a bath of a washing solution; a blower unit associated with the tank for creating a flow of a gaseous medum being cleaned between the inlet and the outlet of the tank; and baffles arranged partially immersed in the bath in the tank and between the blower unit and the tank outlet for creating a large surface across the gaseous flow and facilitating separation of particulate matter from the medium being cleaned.

In a preferred embodiment of the present invention, the baffles include a plurality of cylinders constructed from a mesh material and arranged in at least one tier. Desirably, the cylinders are tiered within a channel formed by a pair of substantially parallel walls arranged in substantially vertical, spaced relationship in the tank, while advantageously there are a plurality of channels, each formed by a pair of substantially parallel walls, with a predetermined number of the channels being provided with tiered mesh cylinders. The preferred arrangement is to have the cylinders tiered in alternate ones of the channels, so that the channels not provided with cylinders will permit a unidirectional flow through the baffle-provided cylinders and create a tortuous flow of the gaseous medium being cleaned through the baffles and, accordingly, the tank.

One or more drains are advantageously provided in the bottom of the tank for permitting removal of the residue separated from the gaseous medium being cleaned. This residue will be permitted to fall to the bottom of the tank under the influence of gravity.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary, sectional view taken generally along the line 3—3 of FIG. 1.

DESCRIPTION OF THE PREFERRED EMBODIMENTS

Figure 1:
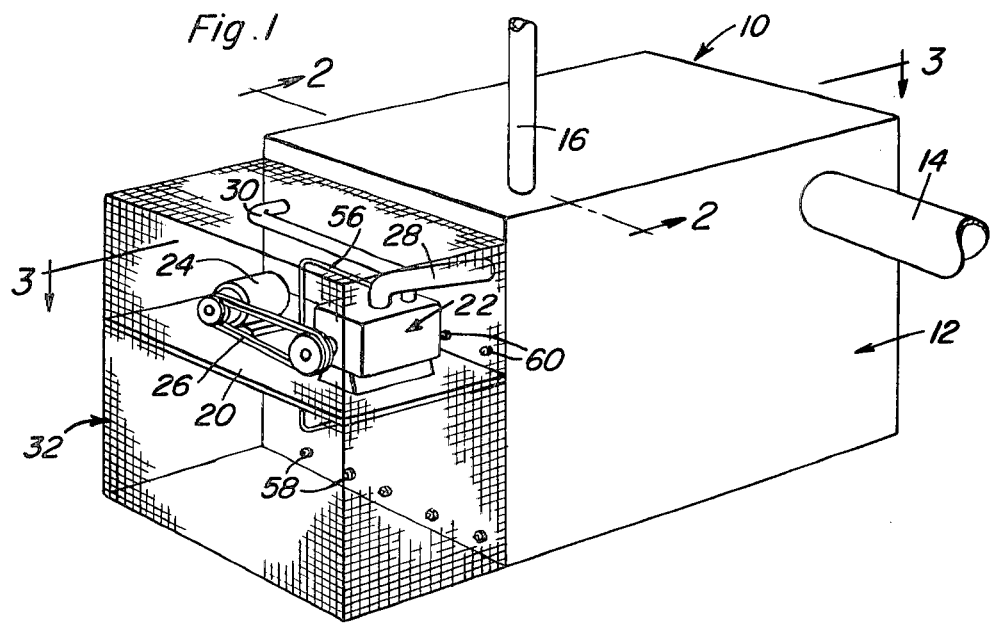
FIG. 1 is a fragmentary, schematic, perspective view showing a pollution control device according to the present invention.

Referring now more particularly to the figures of the drawings, a pollution control device 10 according to the present invention includes a tank 12 having an inlet pipe 14 and an outlet pipe 16 forming an inlet and outlet, respectively, for tank 12. The latter forms a liquid, and preferably also a gaseous, tight enclosure which holds a bath 18 of a washing solution. The washing solution may be any known cleaning solution suitable for the purpose, and therefore will not be disclosed in detail herein.

A platform 20 is cantilever mounted onto one side, or end, of tank 12, in any suitable manner, such as by welding, for supporting a conventional blower unit 22. This blower unit 22 is actuated in a conventional manner by a, for example, suitable electric motor 24 connected to an input shaft of unit 22 as by a conventional belt 26. Pipes 28 and 30 are connected to the input and output of blower unit 22 and tank 12 for inserting blower unit 22 into a flow path created for a gaseous medium being cleaned. An enclosure 32, which may be constructed from, for example, expanded metal, and the like, is advantageously arranged about platform 20 for reasons of safety in the operation of device 10 and to prevent unauthorized persons from tampering with blower unit 22.

Baffles 34 are arranged in tiers 36 within tank 12, and partially immersed in bath 18, between blower unit 22 and tank outlet pipe 16 for creating a large surface area across the gaseous flow path referred to above and facilitating separation of particulate matter from the gaseous medium being cleaned. These baffles 34 are advantageously in the form of a plurality of cylinders 38 constructed from a suitable mesh material. As can be appreciated from FIGS. 2 and 3 of the drawings, a plurality of channels 40 and 42 are formed within tank 12 by a plurality of associated walls 44, 46, and 48. As can best be seen from FIG. 2, walls 44 are connected to the top wall of tank 12, while walls 46 are connected to the bottom wall of tank 12. Wall 48 extends between the top and bottom walls of tank 12 in order to provide a channel 50, whose function will be discussed below. Supports 52 are advantageously connected between walls 46, and 48, and the walls 44 associated with the aforementioned walls 46 and 48 to form a channel 42 for bracing the baffle system and for providing support for the cylinders 38 arranged within the channels 42. As will be noted from FIG. 2, an opening 54 is provided in the top wall of tank 12 for placing the right-handmost channel 42 as seen in FIG. 2 in communication with outlet pipe 16.

Figure 2:
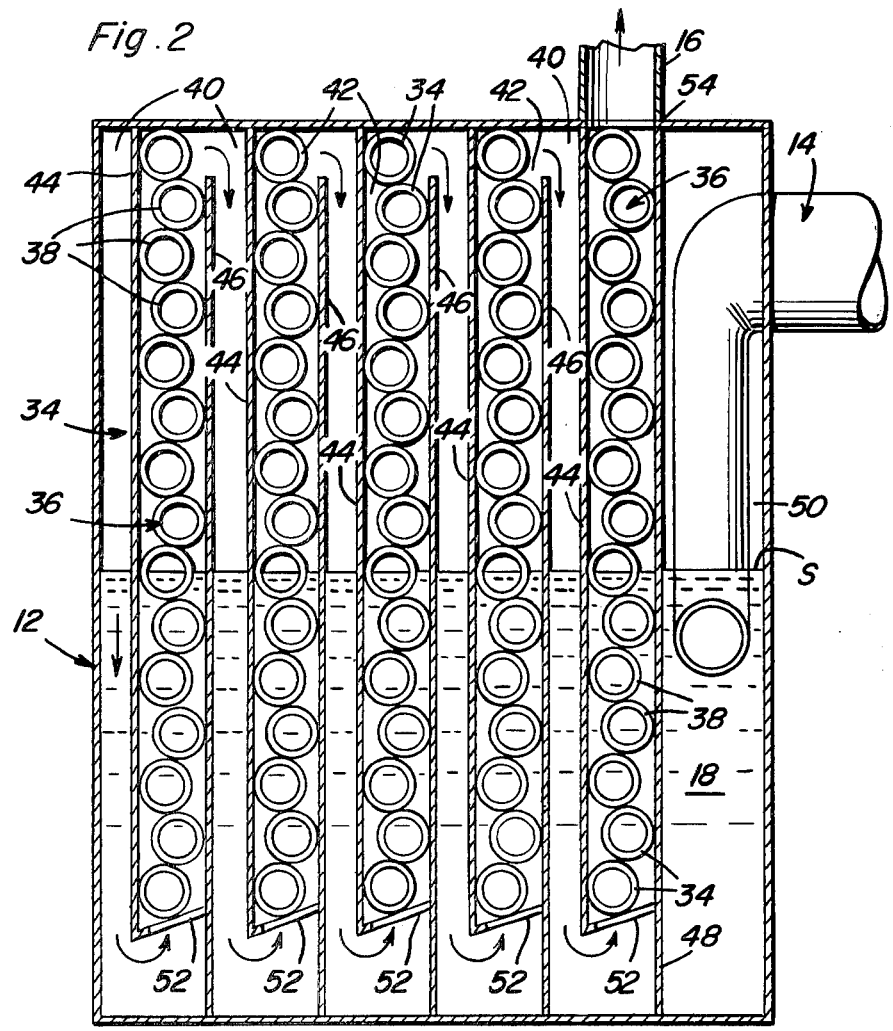
FIG. 2 is a fragmentary, sectional view taken generally along the line 2—2 of FIG. 1.

As will be readily appreciated from FIGS. 2 and 3 of the drawings, the plurality of channels 40, 42, each of which is formed by a respective pair of the substantially parallel walls 44, 46, and 48, are arranged alternately so that only the channels 42 retain tiered cylinders 38. In this manner, the flow path through baffles 34 is arranged such that the medium, such as combustion gases, being cleaned flows upwardly through channels 42 and downwardly through channels 40. As mentioned above, the channel 42 spaced farthest along the flow path from blower unit 22 is connected directly to outlet pipe 16 by means of opening 54 provided in the top wall of tank 12.

A conventional fluid line 56 is illustrated in FIGS. 1 and 3 of the drawings as passing from tank 12, at a point thereon beneath the surface S (FIG. 2) of bath 18, and in communication with bath 18, to the input side of blower unit 22 for passing a predetermined quantity of the cleaning solution through blower unit 22 for cooling same. In this manner, blower unit 22 is assured of being constantly supplied with a cooling fluid during operation of device 10.

A plurality of drain plugs 58 can be prearranged at the bottom of tank 12 in FIG. 1 of the drawings, while a plurality of fill plugs 60 can also be seen in FIG. 1, as well as FIG. 3, as arranged just above platform 20. While a plurality of plugs 58 and 60 are shown in the drawings, it will be readily appreciated that while a plurality of such plugs is desirable only one each of same is necessary. Plugs 58 facilitate removal or residue (not shown) from the bottom of tank 12 so that this waste deposited as a residue can be converted into any of several useful by-products, such as asphalt paving and fuel. Further, plugs 58 permit convenient draining of cleaning solution from tank 12 under the force of gravity. Plugs 60 cooperate with plugs 58 to facilitate recharging of bath 18 in tank 12 by permitting fresh cleaning solution to be injected into the tank. Of course, plugs 60 will be arranged just above the desired surface S of bath 18.

As will be readily understood from the above description and from the drawings, combustion gases, and the like, enter tank 12 through Pipe 14 at a point beneath the surface S of bath 18, are bubbled through the cleaning solution forming bath 18, pass from the bath 18 into the open space defined in channel 50 above the surface S of bath 18, pass through pipe 28 and into blower unit 22, forced by blower unit 22 through pipe 30 and into the left-hand channel 40 as seen in FIG. 2, forced downwardly through the aforementioned left-hand channel 40 into bath 18 by the fluid current generated by blower unit 22, passes beneath the wall 44 defining the left-hand channel 40 and past the braces 52 into the left-hand channel 42 as seen in FIG. 2, passes upwardly through this left-hand channel 42 through the plurality of tiered cylinders 38 arranged therein, and repeats the above tortuous cycle through the remaining channels 40 and 42 until the scrubbed gaseous medium passes out of tank 12 through outlet pipe 16. The large surface provided by cylinders 38—which may be, for example, 4 inch diameter clinders constructed from a 1/16 inch mesh material—functions to intercept liquid particles as the gaseous medium flows sinuously between the walls, or plates, forming channels 40 and 42 by maintaining the velocity of the flow of the gaseous medium through baffles 34, reentrainment of the liquid deposited on the cylinders 38 into the flow of gaseous medium can be avoided. The liquid collected on cylinders 38 drains under the force of gravity back into bath 18, where the particulate matter entrapped in this liquid will gravitate to the bottom of tank 12 for subsequent removal. After passing through the aforementioned washing, or scrubbing, process, the gaseous medium being cleaned may then be passed from outlet pipe 16 through a dry-air chamber (not shown) and subsequently through activated charcoal (not shown), and the like, just prior to the gaseous medium being released into the atmosphere.

In larger industrial units, a centrifuge (not shown) will advantageously be employed to remove the residue which has been changed from a gas to solids, thus separating the solids from the washing solution and recycling the solution back into device 10 for further use.

It will be appreciated that in addition to being useful for scrubbing combustion gases generated by gas burning incinerators, and the like, a device 10 according to the invention can also be installed at the inlet of air conditioning units of various sizes for cleaning air being fed into the air conditioning unit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An anti-pollution device for polluted gaseous medium from incinerators and the like, comprising, in combination: a tank having an inlet for the gaseous medium and an outlet for cleaned gases, and holding a bath of a washing solution; single blower means having an input and output connected to said tank but mounted outside thereof for creating a flow of a gaseous medium being cleaned between the inlet and the outlet of the tank and having another input, a line having one end connected to the tank and in communication with the bath and having the other end connected to said another input, said blower means inducting the washing solution through said line for cooling the blower means, and baffle means for creating a large surface across the flow of gaseous medium and facilitating separation of particulate matter from the medium being cleaned arranged in the tank, and partially immersed in the bath, between the output of said blower means and the tank outlet.

2. A structure as defined in claim 1, wherein the baffle means includes a plurality of cylinders constructed from a mesh material and arranged in tiers.

3. A structure as defined in claim 2, wherein the baffle means further includes a channel formed by a pair of substantially parallel walls arranged in substantially vertical, spaced relationship in the tank, the tiers of cylinders being arranged between and retained by the walls.

4. A structure as defined in claim 3, wherein there are a plurality of said channels, each formed by a pair of substantially parallel walls, and a plurality of said tiers of cylinders, the number of said tiers of cylinders being less than the number of said channels, with the tiers being arranged in selected ones of the channels, the tiers of cylinders being arranged in alternate ones of the channels for defining a flow path through the baffle means in which the medium being cleaned flows upwardly through the channels having the tiers of cylinders and downwardly through the other channels, the channel spaced farthest along the flow of said gaseous medium from the blower means being connected to the outlet of the tank.

5. A structure as defined in claim 4, wherein a plurality of drain and filling means are provided on the tank for removing residue from the tank and recharging the bath in the tank.

6. A structure as defined in claim 1, wherein a plurality of drain and filling plugs are provided on the tank for removing residue from the tank and recharging the bath in the tank.

* * * * *